United States Patent
D'Souza et al.

(10) Patent No.: US 7,881,210 B2
(45) Date of Patent: Feb. 1, 2011

(54) METHOD AND APPARATUS FOR IDENTIFYING LABEL DISTRIBUTION PROTOCOL FLAPPING EVENTS

(75) Inventors: Kevin D'Souza, Cranbury, NJ (US); Leah Zhang, Holmdel, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 125 days.

(21) Appl. No.: 12/248,316

(22) Filed: Oct. 9, 2008

(65) Prior Publication Data
US 2010/0091778 A1    Apr. 15, 2010

(51) Int. Cl.
*G01R 31/08* (2006.01)
(52) U.S. Cl. .................... 370/245; 370/248
(58) Field of Classification Search ........... 370/242, 370/243, 244, 245, 248, 252, 401
See application file for complete search history.

(56) References Cited

U.S. PATENT DOCUMENTS

| | | | |
|---|---|---|---|
| 6,912,574 B2* | 6/2005 | Scifres et al. ............ 709/224 |
| 7,062,283 B2* | 6/2006 | Dooley ..................... 455/504 |
| 7,376,154 B2* | 5/2008 | Ilnicki et al. .............. 370/488 |
| 7,406,030 B1* | 7/2008 | Rijsman .................... 370/216 |
| 7,417,947 B1* | 8/2008 | Marques et al. ........... 370/220 |
| 7,529,192 B2* | 5/2009 | Labovitz ................... 370/236 |
| 2006/0077991 A1* | 4/2006 | Kawarai ................... 370/403 |
| 2008/0084880 A1* | 4/2008 | Dharwadkar ............. 370/392 |
| 2009/0046579 A1* | 2/2009 | Lu et al. .................... 370/225 |
| 2009/0049196 A1* | 2/2009 | Smith et al. .............. 709/245 |

* cited by examiner

*Primary Examiner*—Ricky Ngo
*Assistant Examiner*—Christine Ng (57) ABSTRACT

A method and apparatus for identifying a Label Distribution Protocol (LDP) flapping event in a communication network are disclosed. For example, the method counts a total number of LDP session up events, a total number of LDP session down events, a total number of link up events, and a total number of link down events within a predetermined time interval. The method then determines an occurrence of a LDP flapping event using the plurality of total numbers.

17 Claims, 5 Drawing Sheets

METHOD AND APPARATUS FOR IDENTIFYING LABEL DISTRIBUTION PROTOCOL FLAPPING EVENTS

The present invention relates generally to communication networks and, more particularly, to a method and apparatus for identifying Label Distribution Protocol (LDP) flapping events in a large scale communication network, e.g., packet networks such as Multi-protocol Label Switching (MPLS) networks.

BACKGROUND OF THE INVENTION

Quantification of the real-time Label Distribution Protocol (LDP) neighbor session flaps (i.e., up and down in succession without an identifiable external trigger) may provide a good barometer of network health pointing to potential future customer impacting problems that may occur in a MPLS core network. Notification of such flapping events in a timely manner to the appropriate network operator for further investigation is therefore important to the running of the network.

SUMMARY OF THE INVENTION

In one embodiment, the present invention enables the identification of a Label Distribution Protocol (LDP) flapping event in a communication network. For example, the method counts a total number of LDP session up events, a total number of LDP session down events, a total number of link up events, and a total number of link down events within a predetermined time interval. The method then determines an occurrence of a LDP flapping event using the plurality of total numbers.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, Label Distribution Protocol (LDP) operations begin with a discovery (Hello) process during which an LDP entity (e.g., a local Label Switch Router (LSR)) finds a cooperating LDP peer router in the network and negotiates basic operating procedures between them. The recognition and identification of a peer by means of this discovery process results in a Hello adjacency, which represents the context within which label binding information is exchanged between the local LSR and its LDP peer. LDP functionality then creates an active LDP session between the two LSRs to effect the exchange of label binding information. The result of this process, when carried to completion with respect to all the LSRs in a MPLS network, is a Label Switched Path (LSP), which constitutes an end-to-end packet transmission pathway between the communicating network devices. By means of LDP, LSRs can collect, distribute, and release label binding information to other LSRs in an MPLS network, thereby enabling the hop-by-hop forwarding of packets in the network along Label Switched Path.

In one embodiment, a LDP session refers to an active LDP process between a local LSR and a remote LSR (LDP peer) for purposes of distributing label spaces. There is always a one-to-one correspondence between an LDP peer and an LDP session. A single LDP session is a label distribution instance that communicates across one or more network links with a single LDP Peer.

If a LDP session goes down between the local LSR and its LDP peer, MPLS forwarding will get impacted because the local LSR and its LDP peer can no longer agree on the labels used for packet forwarding. Therefore, it is advantageous to know LDP session failures, especially LDP flapping events—multiple LDP sessions up/down occurring in a short period of time.

Figure 1:
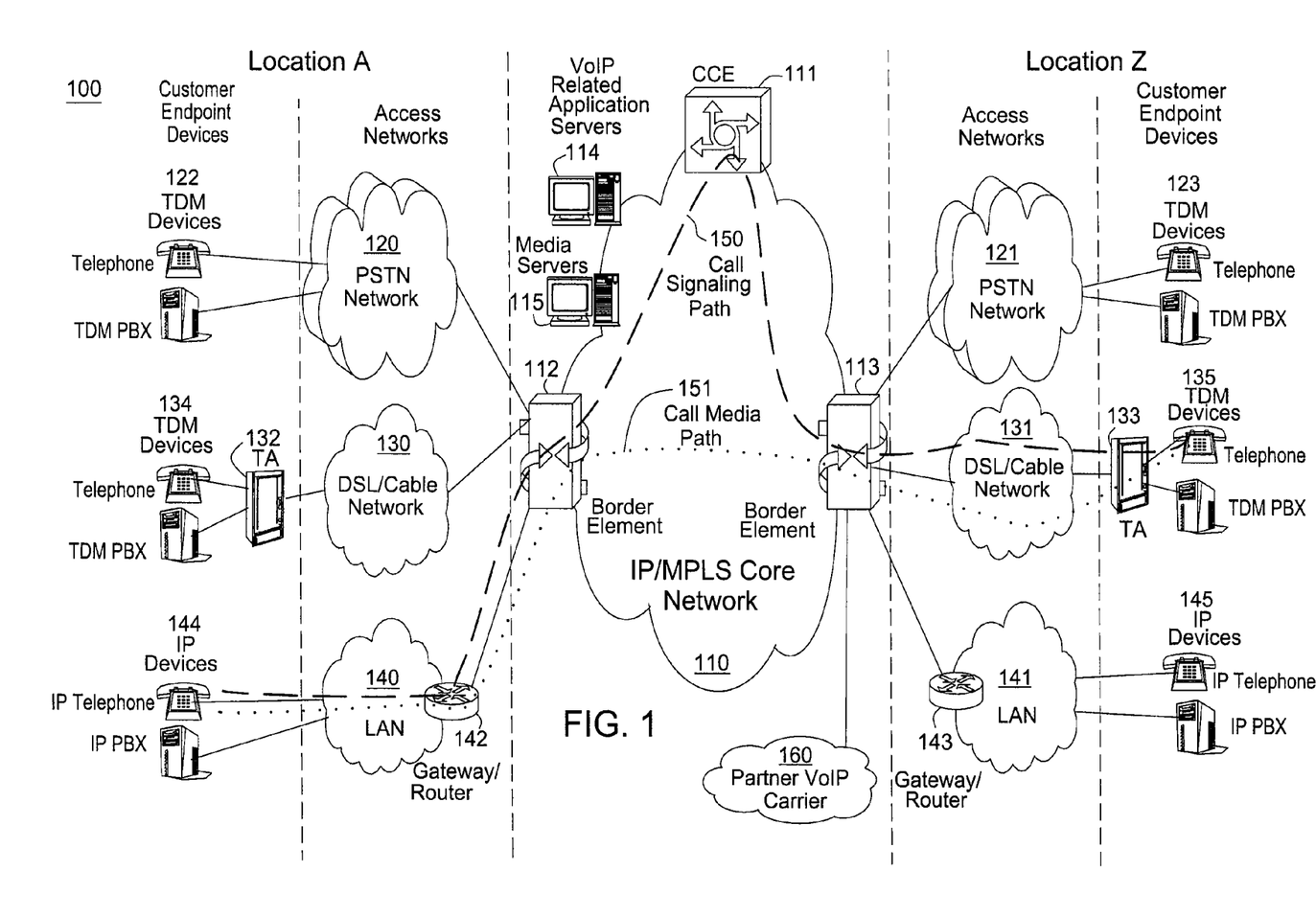
FIG. 1 illustrates a block diagram depicting an exemplary network related to the current invention.

To better understand the present invention, FIG. 1 illustrates is a block diagram depicting an exemplary network 100 related to the current invention. Exemplary networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is an IP network.

In one embodiment, the network 100 comprises various types of customer endpoint devices connected via various types of access networks to a carrier (a service provider) core infrastructure over an Internet Protocol based core backbone network. Broadly defined, a VoIP or SoIP network is a network that is capable of carrying packetized data for voice or other data services over the IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134 and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access network can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The IP core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121, or the Partner VoIP Carrier 160. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup-signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call, CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the called party accepts the call at location Z, a call acknowledgement signaling message, such as a SIP 200 OK response message if SIP is used, is sent in the reverse direction back to the CCE 111. After the CCE 111 receives the call acknowledgement message, it will then send a call acknowledgement-signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which customers may transmit and receive packets for various types of communications services, e.g., VoIP services. More specifically, the above illustrative network is provided to illustrative the present invention for quantifying real-time LDP neighbor session flaps, e.g., as implemented in an application server in the core network 110. For example, one of the network elements in FIG. 1 can be a router that will be monitored in accordance with the methods described below.

Quantification of the real-time Label Distribution Protocol (LDP) neighbor session flaps (i.e., up and down in succession without an identifiable external trigger) may provide a good barometer of network health pointing to potential future customer impacting problems that may occur in a MPLS core network. Notification of such flapping events in a timely manner to the appropriate network operator for further investigation is therefore advantageous to the running of the network.

Alarming and ticketing procedures in most networks may typically concentrate on identifying and ticketing singleton LDP failures, or using generic alarm storm reduction techniques to suppress such LDP events, without identifying LDP flapping scenarios in a single trouble ticket. A singleton LDP event refers to a LDP session up or a LDP session down event that generates a corresponding trap or alarm during normal operations of the network. Existing approaches also have trouble correlating LDP session failures with link failures as there is no easily identifiable common key across these two event types. Therefore, various prior art approaches have a number of drawbacks that include notification of false positives to the network operator, masking the occurrence of genuine problems in the network behind a potential storm of alarms and tickets and suppressing genuine LDP flaps resulting from using generic (i.e., MPLS and LDP unaware) algorithms to suppress alarm and trouble ticket storms.

To address this criticality, the present invention enables the identification of such customer impacting LDP session flaps while discarding events that occur in the normal operation of a large network. The present invention provides a method to group such LDP session flaps together and then generate a single ticket corresponding to the occurrence of such an LDP flapping event. In one embodiment, the present invention uses a premise of counting LDP session failures but then provides compensatory logic to ensure that what is used to create a trouble ticket for operations action is a legitimate LDP flapping event. For example, if the number of LDP session down counts are much greater than the number of link down counts or if the number of LDP session up counts are much greater than the number of link up counts, it can be inferred that there are LDP session down or up events not caused by underlying link down or up events, but rather LDP protocol errors such as LDP flaps (e.g., the LDP sessions goes up or down continuously). Therefore, the present invention identifies LDP flapping events and not singleton LDP events and eliminates residual LDP session failures caused by normal network operations events specifically LDP link up and down events. Namely, the present invention is able to identify LDP flapping events that are not caused by commonly occurring underlying network events during normal operations of the network.

While a simple overall principle can be applied to detect such LDP failures, it quickly gets complex when one tries to identify if this is a genuine LDP flapping event that has potential future impact, or just another aspect of the network's day-to-day operating protocol. Label Distribution Protocol (LDP) is fundamental to a MPLS network. In an MPLS network, label switching routers (LSRs) must agree on the definition of the labels being used for packet forwarding operations. Label agreement is achieved in an MPLS network by means of procedures defined in the LDP.

In one embodiment, the present invention is built on several fundamental assumptions about the LDP configuration on the router and LDP session failures:

- LDP is enabled interface by interface, or subinterface by subinterface. The number of LDP sessions on a single router is equal to or less than the number of LDP enabled interface or subinterface on the LSR. A subinterface refers to a logical interface or channel within an interface.
- If there are multiple links (interfaces or subinterfaces) connecting the local LSR and neighboring LSR, the number of LDP sessions between these two LSRs are equal to or less than the number of the links connecting the two LSRs depending on the implementation. There could be a single LDP session established between the two LSRs over the multiple links for exchanging label space information.
- If there is a single LDP session established over a single link (interface or subinterface) connecting the local LSR and its neighboring LSR, when the link fails, the LDP session goes down. When the link goes back up, the LDP session goes up.
- If there is single LDP session established over multiple links (multiple interfaces or subinterfaces) connecting the local LSR and its neighboring LSR, the LDP session goes down only when all the links fail.
- If there are multiple LDP sessions established over multiple links (multiple interfaces or subinterfaces) connecting the local LSR and its neighboring LSR, when a particular link fails, the LDP session riding on the link will fail.
- LDP session failures could be caused by LDP protocol failures other than underlying link failures.

Given these fundamental assumptions, the number of LDP session ups and downs can be counted by comparing the LDP session up counts with the link up counts and the LDP session down counts with the link down counts over a period of time on a single router. If the number of LDP session down counts are much greater than the number of link down counts or if the number of LDP session up counts are much greater than the number of link up counts, it can be inferred that there are LDP session down or up events not caused by underlying link down or up events, but rather LDP protocol errors such as LDP flaps (e.g., the LDP sessions goes up or down continuously). This type of conditions will likely have serious impact on the MPLS operations of the routers in an MPLS network.

Figure 2:
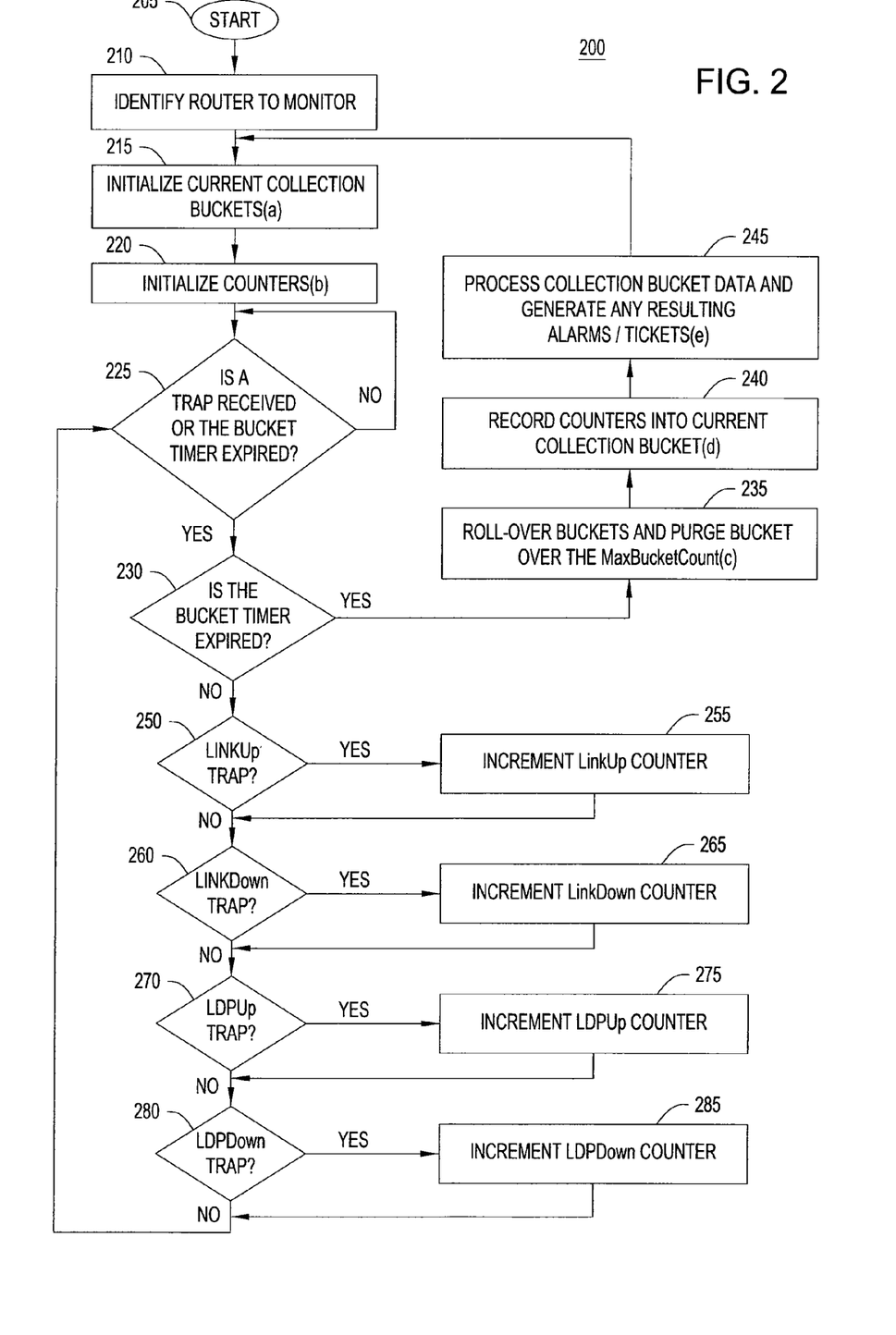
FIG. 2 illustrates a flowchart of a method for identifying LDP flapping events in a packet network, e.g., a MPLS network, of the present invention.

In one embodiment, the present invention uses the following defined variables in its method to identify LDP flapping events. It should be noted that the names of these variables are only illustrative, and that these variables can be implemented using any other names. For example, these variables are:

BucketInterval (bi)—The time lapse between the bucket start time and bucket end time;

BucketStartTime (bs)—Time at which the Collection Bucket starts;

BucketEndTime (be)—Time at which the Collection Bucket ends (=bs+bi);

MaxBucketCount (mc)—Number of past collection buckets over which the alarm analysis is performed;

LinkUp (ku)—Running count of number of link up events;

LinkDown (kd)—Running count of number of link down events;

LDPUp (lu)—Running count of number of LDP session up events;

LDPDown (ld)—Running count of number of LDP session down events;

ThresholdCount (tc)—The threshold number of events over which an alarm generation is considered;

BucketLinkUp (bku)—Count of number of link up events in the current collection bucket;

BucketLinkDown (bkd)—Count of number of link down events in the current collection bucket;

BucketLDPUp (blu)—Count of number of LDP session up events in the current collection bucket;

BucketLDPDown (bld)—Count of number of LDP down events in the current collection bucket;

LinkUpCompareCount (kuc)—Count of number of link up events to compare with the threshold LinkDownCompareCount (kdc)—Count of number of link down events to Compare with the threshold;

LDPUpCompareCount (luc)—Count of number of LDP session up events to compare with the threshold;

LDPDownCompareCount (ldc)—Count of number of LDP down events to compare with the threshold;

FIG. 2 illustrates a flowchart of a method 200 for identifying LDP flapping events in a MPLS network of the present invention. For example, method 200 identifies LDPUp and LDPDown counts exceeding normal network DP Session Flapping thresholds (i.e., LDP flapping events) using the formula specified below:

if[(LDPUp>TresholdCount)AND(LDPUp>LinkUp)
    AND((LDPDown>0)]OR
    [(LDPDown>TresholdCount)AND
    (LDPDown>LinkDown)AND(LDPUp>0)]

The method invokes the formula only after removing spurious data. Method 200 starts in step 205 and proceeds to step 210. In step 210, the method identifies a router, e.g., an LSR, to be monitored.

In step 215, the method initializes the variables associated with the current collection bucket. For example, the method sets variable "bi" to the value of A, where A is the bucket interval value in seconds which is a user configurable parameter. The method also sets variable "bs" to the value of B, where B is automatically initialized in live application based on data being analyzed. The method sets variable "be" to the value of the sum of variable bs and variable bi. For example, "bi", "bs", and "be" can be defined as:

bi=A (A=bucket interval in seconds, e.g., 600 for 10 m, 1200 for 20 m, 1800 for 30 m, 3600 for 1 hr)

bs=B (automatically initialized in live application based on data being analyzed)

$$be=bs+bi$$

In step 220, the method initializes the variables associated with the counters. For example, the method initializes the variable "mc" to the maximum number of collection buckets, C, minus 1, where the maximum number of collection buckets has to be greater than 1 and is a user configurable parameter. The method initializes the variable "tc" to the threshold count, D (e.g., D is set to 5 in one illustrative example), for the generation of alarm where threshold count is a user configurable parameter. It should be noted that D can be set to other values in accordance with the requirements of a particular implementation. The method also initializes variables "ku", "kd", "lu", "ld", "$bku_0$", "$bkd_0$", "$blu_0$", and "$bld_0$" all to zero. For example, "mc", "tc", "ku", "kd", "lu", "ld", "$bku_0$", "$bkd_0$", "$blu_0$", and "$bld_0$" can be defined as:

mc=C−1 (C=maximum number of collection buckets, and is >1)

tc=D (D=threshold count for generation of alarm on above counters)

ku=0 (LinkUp Count)

kd=0 (LinkDown Count)

lu=0 (LDPUp Count)

ld=0 (LDPDown Count)

$bku_0$=0 (BucketLinkUp Count)

$bkd_0$=0 (BucketLinkDown Count)

$blu_0$=0 (BucketLDPUp Count)

$bld_0$=0 (BucketLDPDown Count)

In step 225, the method 200 checks or determines if a trap is received or the bucket timer has expired. If a trap is received or the bucket timer has expired, the method proceeds to step 230; otherwise, the method proceeds back to step 225.

In step 230, the method checks if the bucket timer has expired. If the bucket timer has expired, the method proceeds to step 235; otherwise, the method proceeds to step 250, signifying that a trap is received.

In step 235, the method rolls over the buckets keeping track of the various LDP event counters and purges the bucket over the MaxBucketCount. The details of step 235 can be found in method 300 shown in FIG. 3.

In step 240, the method records the values in various LDP event counters into the current collection bucket, e.g., in accordance with a sliding window basis using a window size equal to a predetermined time interval. For example, the method sets variable "$bku_0$" to the value of variable "ku", variable "$bkd_0$" to the value of variable "kd", variable "$blu_0$" to the value of variable "lu", and variable "$bld_0$" to the value of variable "ld". For example, "$bku_0$", "$bkd_0$", "$blu_0$", and "$bld_0$" can be defined as:

$bku_0$=ku $bkd_0$=kd $blu_0$=lu $bld_0$=ld

In step 245, the method processes the collection bucket data and generates any resulting alarms or trouble tickets and then proceeds back to step 215. The details of step 245 can be found in method 400 shown in FIG. 4.

In step 250, the method checks if a link up trap is received. If a link up trap is received, the method proceeds to step 255; otherwise, the method proceeds to step 260. In step 255, the method increments the LinkUp counter and then proceeds to step 260.

In step 260, the method checks if a link down trap is received. If a link down trap is received, the method proceeds to step 265; otherwise, the method proceeds to step 270. In step 265, the method increments the LinkDown counter and proceeds to step 270.

In step 270, the method determines if a LDP session up trap is received. If a LDP session up trap is received, the method proceeds to step 275; otherwise, the method proceeds to step 280. In step 275, the method increments the LDPUp counter and then proceeds to step 280.

In step 280, the method checks if a LDP session down trap is received. If a LDP session down trap is received, the method proceeds to step 285; otherwise, the method proceeds back to step 225.

In step 285, the method increments the LDPDown counter and then proceeds back to step 225.

It should be noted that some typical anomalies and their associated recommended handling are listed below. These are extensions to the present invention described above:

Entire Router Down—in such cases, all up or down events should be disregarded and no LDP Flap tickets needs to be generated. Such a condition can be identified by looking for node down and node up events within the current collection bucket and the preceding collection buckets.

LDP session up count significantly greater than LDP session down count (e.g., 75% or more)—this could indicate that LDP was gracefully initialized on a router or another event significantly greater in scope that has impacted LDP has occurred (e.g., router re-loaded) and should be discounted. Alternatively, such an event can be ticketed as a catastrophic LDP event on the router and correlated by downstream systems with other macro data such as router down alarms.

LDP session down count significantly greater than and LDP session up count (e.g., 75% or more)—this could indicate that LDP was gracefully terminated on a router or another event significantly greater in scope that has impacted LDP has occurred (e.g., router re-loaded) and should be discounted. Alternatively, such an event can be ticketed as a catastrophic LDP event on the router and correlated by downstream systems with other macro data such as router up alarms.

Link down count significantly greater than and LDP session down count (e.g., 50% or more)—this could indicate that the router has significantly more links than neighbors. In such cases if the LDP session down count is roughly equal to the router's neighbor count in magnitude, then this event should be ticketed as a LDP flapping event. To account for this situation, additional inputs that are typically available from topology and route monitoring systems, will be required by this method to determine the number of neighbors for this router (e.g., count of Open Shortest Path First (OSPF) neighbor adjacencies). Such a neighbor count will influence the setting of the threshold count variable, but otherwise the method can be used with minor adjustments to the formula in terms of comparing the LDP session down count to the link down count and the LDP session up count to the link up count. The Open Shortest Path First (OSPF) protocol is a hierarchical internet routing protocol that uses a link-state to calculate the shortest path tree in the individual areas that make up the hierarchy. It should be noted that the various percentage values provided above are only illustrative. These percentage values can be adjusted in accordance with the requirements of a particular implementation.

Figure 3:
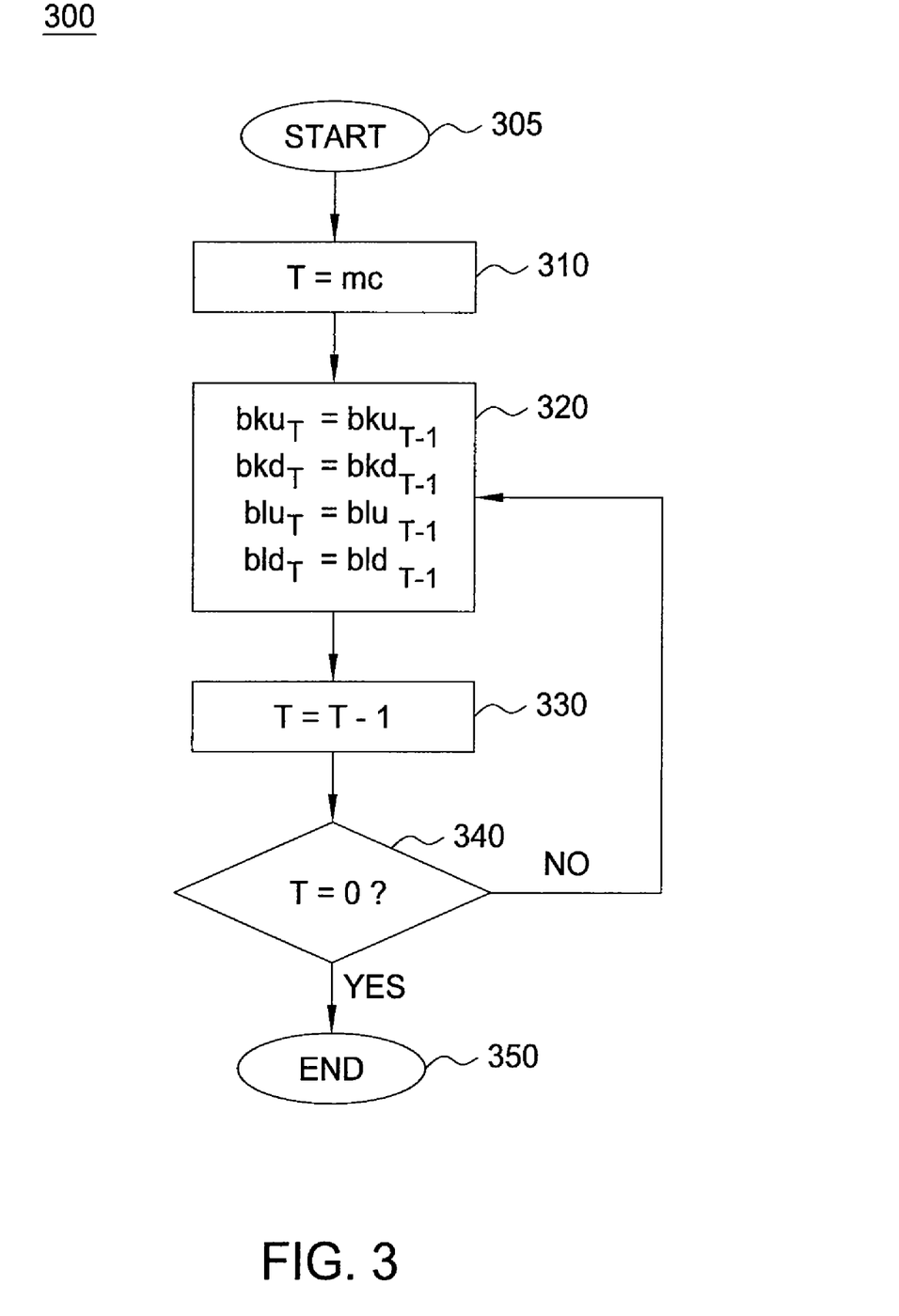
FIG. 3 illustrates a flowchart of a method for rolling over buckets of the present invention.

FIG. 3 illustrates a flowchart of a method 300 for rolling over buckets of the present invention. Method 300 starts in step 305 and proceeds to step 310.

In step 310, the method sets variable "T" to the value of variable "mc". In step 320, the method sets variable "bku$_T$" to the value of "bku$_{T-1}$", variable "bkd$_T$" to the value of "bkd$_{T-1}$", variable "blu$_T$" to the value of "blu$_{T-1}$", and variable "bld$_T$" to the value of "bld$_{T-1}$". The step basically copies the aforementioned bucket counter variables from bucket "T-1" into bucket "T".

In step 330, the method decrements variable "T". In step 340, the method checks if T=0. If T=0, then the method proceeds to step 350; otherwise, the method proceeds to step 320. The method ends in step 350.

Figure 4:
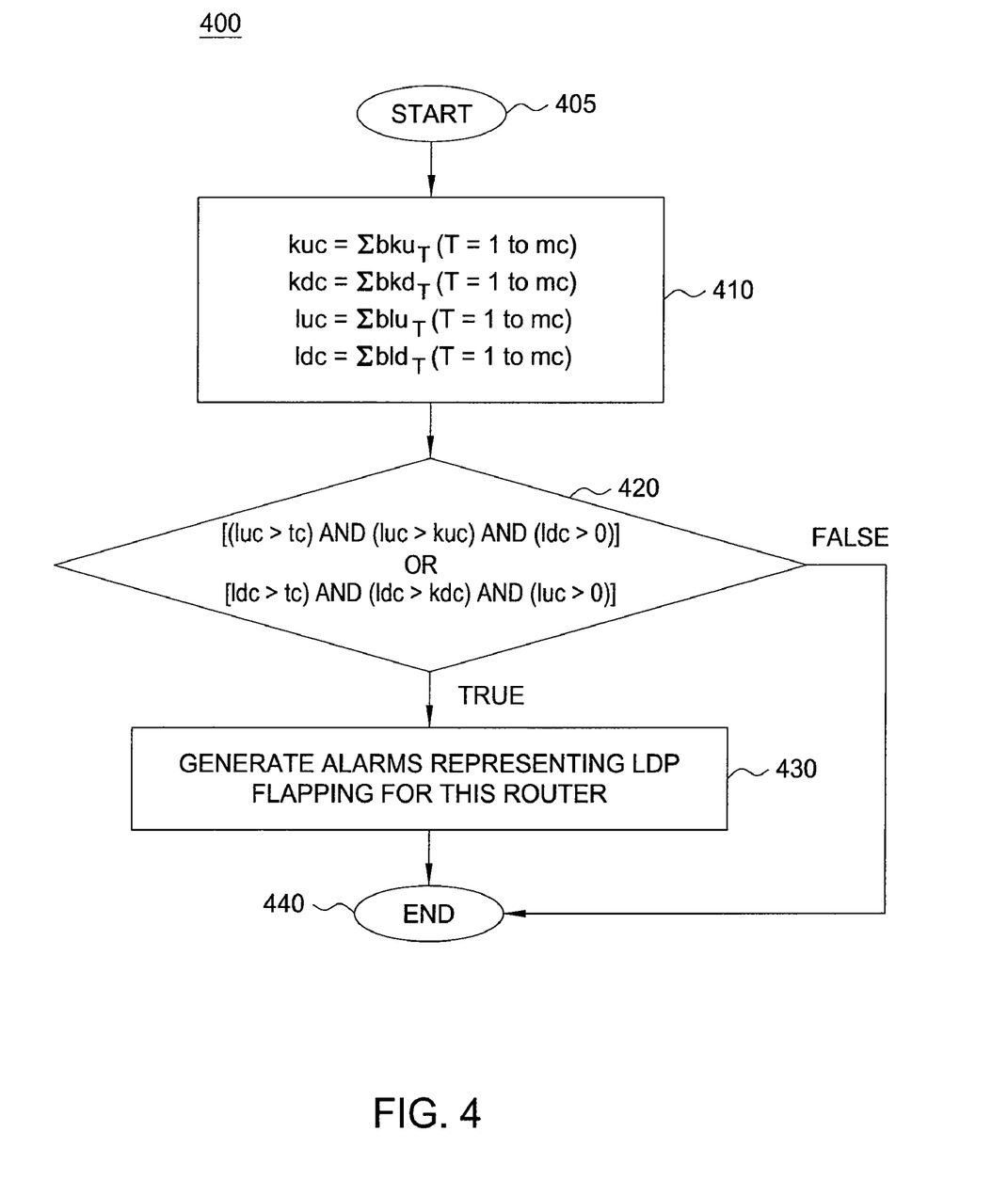
FIG. 4 illustrates a flowchart of a method for processing alarms of the present invention.

FIG. 4 illustrates a flowchart of a method 400 for processing alarms of the present invention. Method 400 starts in step 405 and proceeds to step 410.

In step 410, the method sets variable "kuc" to the value of the sum of "bku$_T$" for T starting from 1 to the value of variable "mc", variable "kdc" to the value of the sum of "bkd$_T$" for T starting from 1 to the value of variable "mc", variable "luc" to the value of the sum of "blu$_T$" for T starting from 1 to the value of variable "mc", and variable "ldc" to the value of the sum of "bld$_T$" for T starting from 1 to the value of variable "mc".

In step 420, the method checks if the condition of {[(luc>tc) AND (luc>kuc) AND (ldc>0)] OR [(ldc>tc) AND (ldc>kdc) AND (luc>0)]} is true. In other words, the method checks if [(LDPUp>TresholdCount) AND (LDPUp>LinkUp) AND (LDPDown>0)] OR [(LDPDown>TresholdCount) AND (LDPDown>LinkDown) AND (LDPUp>0)] is true. If the condition is true, the method proceeds to step 430; otherwise, the method proceeds to step 440. In step 430, the method generates alarms indicating LDP flapping for this router. The method ends in step 440.

It should be noted that although not specifically specified, one or more steps of methods 200, 300 and 400 may include a storing, displaying and/or outputting step as required for a particular application. In other words, any data, records, fields, and/or intermediate results discussed in the method 200, 300 or 400 can be stored, displayed and/or outputted to another device as required for a particular application. Furthermore, steps or blocks in FIG. 2, FIG. 3 or FIG. 4 that recite a determining operation, or involve a decision, do not necessarily require that both branches of the determining operation be practiced. In other words, one of the branches of the determining operation can be deemed as an optional step.

Figure 5:
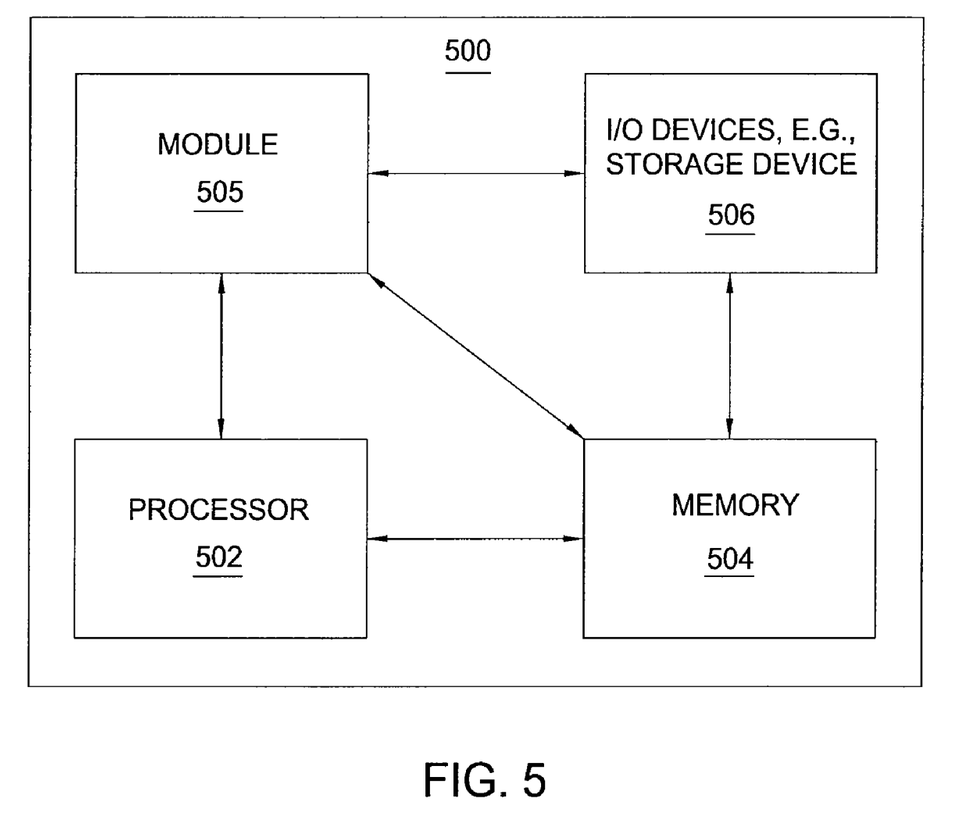
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for identifying LDP flapping events, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for identifying LDP flapping events can be loaded into memory 504 and executed by processor 502 to implement the functions as discussed above. As such, the present process 505 for identifying LDP flapping events in a large scale packet network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for identifying a label distribution protocol flapping event in a communication network, comprising:
    counting via a processor a total number of label distribution protocol session up events, a total number of label distribution protocol session down events, a total number of link up events, and a total number of link down events within a predetermined time interval; and
    determining an occurrence of a label distribution protocol flapping event using the plurality of total numbers, wherein the determining comprises:
        evaluating a condition of whether: a) the total number of label distribution protocol session up events is greater than a threshold, and the total number of label distribution protocol session up events is greater than the total number of link up events, and the total number of label distribution protocol session down events is greater than 0, or b) the total number of label distribution protocol session down events is greater than the threshold, and the total number of label distribution protocol session down events is greater than the total number of total link down events and the total number of label distribution protocol session up events is greater than 0, is true; and
        generating an alarm to indicate the label distribution protocol flapping event if the condition is true.

2. The method of claim 1, wherein the communication network comprises a multi-protocol label switched network.

3. The method of claim 1, wherein the plurality of total numbers is recorded on a sliding window basis using a window size equal to the predetermined time interval.

4. The method of claim 1, wherein the method further comprises:
    disregarding a scenario in which an entire router is down.

5. The method of claim 1, wherein the method further comprises:
    disregarding a scenario in which the total number of label distribution protocol session up events is significantly greater than the total number of label distribution protocol session down events.

6. The method of claim 1, wherein the method further comprises:
    disregarding a scenario in which the total number of label distribution protocol session down events is significantly greater than the total number of label distribution protocol session up events.

7. The method of claim 1, wherein the method further comprises:
    declaring the label distribution protocol flapping event if the total number of link down events is significantly greater than the total number of label distribution protocol session down events.

8. A non-transitory computer-readable medium having stored thereon a plurality of instructions, the plurality of instructions including instructions which, when executed by a processor, cause the processor to perform a method for identifying a label distribution protocol flapping event in a communication network, comprising:

counting a total number of label distribution protocol session up events, a total number of label distribution protocol session down events, a total number of link up events, and a total number of link down events within a predetermined time interval; and determining an occurrence of a label distribution protocol flapping event using the plurality of total numbers, wherein the determining comprises:

evaluating a condition of whether: a) the total number of label distribution protocol session up events is greater than a threshold, and the total number of label distribution protocol session up events is greater than the total number of link up events, and the total number of label distribution protocol session down events is greater than 0, or b) the total number of label distribution protocol session down events is greater than the threshold, and the total number of label distribution protocol session down events is greater than the total number of total link down events and the total number of label distribution protocol session up events is greater than 0, is true; and generating an alarm to indicate the label distribution protocol flapping event if the condition is true.

9. The non-transitory computer-readable medium of claim 8, wherein the communication network comprises a multi-protocol label switched network.

10. The non-transitory computer-readable medium of claim 8, wherein the plurality of total numbers is recorded on a sliding window basis using a window size equal to the predetermined time interval.

11. The non-transitory computer-readable medium of claim 8, wherein the method further comprises:

disregarding a scenario in which an entire router is down.

12. The non-transitory computer-readable medium of claim 8, wherein the method further comprises:

disregarding a scenario in which the total number of label distribution protocol session up events is significantly greater than the total number of label distribution protocol session down events.

13. The non-transitory computer-readable medium of claim 8, wherein the method further comprises:

disregarding a scenario in which the total number of label distribution protocol session down events is significantly greater than the total number of label distribution protocol session up events.

14. The non-transitory computer-readable medium of claim 8, wherein the method further comprises:

declaring the label distribution protocol flapping event if the total number of link down events is significantly greater than the total number of label distribution protocol session down events.

15. An apparatus for identifying a label distribution protocol flapping event in a communication network, comprising:

means for counting a total number of label distribution protocol session up events, a total number of label distribution protocol session down events, a total number of link up events, and a total number of link down events within a predetermined time interval; and means for determining an occurrence of a label distribution protocol flapping event using the plurality of total numbers, wherein the determining means comprises:

means for evaluating a condition of whether: a) the total number of label distribution protocol session up events is greater than a threshold, and the total number of label distribution protocol session up events is greater than the total number of link up events, and the total number of label distribution protocol session down events is greater than 0, or b) the total number of label distribution protocol session down events is greater than the threshold, and the total number of label distribution protocol session down events is greater than the total number of total link down events and the total number of label distribution protocol session up events is greater than 0, is true; and means for generating an alarm to indicate the label distribution protocol flapping event if the condition is true.

16. The apparatus of claim 15, wherein the communication network comprises a multi-protocol label switched network.

17. The apparatus of claim 15, wherein the plurality of total numbers is recorded on a sliding window basis using a window size equal to the predetermined time interval.

* * * * *